United States Patent
Calla et al.

(10) Patent No.: US 8,268,237 B2
(45) Date of Patent: Sep. 18, 2012

(54) METHOD OF COATING WITH CRYO-MILLED NANO-GRAINED PARTICLES

(75) Inventors: Eklavya Calla, Bangalore (IN);
Krishnamurthy Anand, Bangalore (IN);
Pazhayannur Ramanathan Subramanian, Niskayuna, NY (US);
Sanjay Kumar Sondhi, Bangalore (IN);
Ramkumar Oruganti, Bangalore (IN)

(73) Assignee: General Electric Company, Schenectady, NY (US)

( * ) Notice: Subject to any disclaimer, the term of this patent is extended or adjusted under 35 U.S.C. 154(b) by 480 days.

(21) Appl. No.: 12/350,517

(22) Filed: Jan. 8, 2009

(65) Prior Publication Data

US 2010/0172789 A1 Jul. 8, 2010

(51) Int. Cl.
*C22C 19/05* (2006.01)
*C22C 1/05* (2006.01)
*B05D 3/00* (2006.01)

(52) U.S. Cl. ........ 420/442; 420/443; 420/445; 427/190; 427/191; 427/192

(58) Field of Classification Search .................. 420/442, 420/443, 445; 427/190–192
See application file for complete search history.

(56) References Cited

U.S. PATENT DOCUMENTS

| | | | |
|---|---|---|---|
| 3,692,501 A | 9/1972 | Hoppin et al. | |
| 3,769,689 A | 11/1973 | Little | |
| 3,864,093 A * | 2/1975 | Wolfla | 428/564 |
| 4,124,737 A * | 11/1978 | Wolfla et al. | 428/640 |
| 4,528,247 A | 7/1985 | Mizuhara | |
| 4,630,692 A * | 12/1986 | Ecer | 175/405.1 |
| 5,062,205 A | 11/1991 | Fraser | |
| 5,141,821 A | 8/1992 | Lugscheider et al. | |
| 5,181,728 A | 1/1993 | Stec | |
| 5,302,414 A | 4/1994 | Alkhimov et al. | |
| 5,316,866 A * | 5/1994 | Goldman et al. | 428/621 |
| 6,186,508 B1 | 2/2001 | Zajchowski et al. | |
| 6,244,599 B1 | 6/2001 | Braun et al. | |
| 6,331,217 B1 | 12/2001 | Burke et al. | |
| 6,491,208 B2 | 12/2002 | James et al. | |
| 6,827,969 B1 | 12/2004 | Skoog et al. | |
| 6,905,728 B1 | 6/2005 | Hu et al. | |
| 6,908,288 B2 | 6/2005 | Jackson et al. | |

(Continued)

FOREIGN PATENT DOCUMENTS

| | | |
|---|---|---|
| EP | 1215301 A1 | 6/2002 |
| EP | 1462546 A2 | 9/2004 |
| EP | 1806429 A1 | 7/2007 |
| EP | 2072634 A2 | 6/2009 |

OTHER PUBLICATIONS

ASM International, Materials Park, Ohio, ASM Specialty Handbook:Nickel, Cobalt, and Their Alloys, "Metallography and Microstructures of Heat Resistant Alloys", Dec. 2000, pp. 302-304.*

(Continued)

*Primary Examiner* — Jessee R. Roe
(74) *Attorney, Agent, or Firm* — Cantor Colburn LLP

(57) ABSTRACT

A method of coating a substrate with cryo-milled, nano-grained particles includes forming a face-centered-cubic gamma matrix comprising nickel, cobalt, chromium, tungsten and molybdenum, adding a dispersion strengthening material to the gamma matrix to form a first mixture, cryo-milling the first mixture to form a second mixture to form a nano-grained structure, and cold spraying the second mixture onto a substrate to form a coating having a nano-grained structure.

7 Claims, 1 Drawing Sheet

U.S. PATENT DOCUMENTS

| | | |
|---|---|---|
| 6,968,990 B2 | 11/2005 | Ott et al. |
| 7,150,091 B2 | 12/2006 | Mall et al. |
| 7,316,057 B2 | 1/2008 | Seth |
| 7,344,675 B2 | 3/2008 | Van Daam et al. |
| 7,378,132 B2 | 5/2008 | Renteria et al. |
| 2003/0141666 A1 | 7/2003 | Crudgington et al. |
| 2005/0087584 A1 | 4/2005 | Abdo et al. |
| 2005/0118330 A1 | 6/2005 | Clark et al. |
| 2006/0172073 A1 | 8/2006 | Groza et al. |
| 2007/0116890 A1 | 5/2007 | Adams et al. |
| 2007/0289490 A1* | 12/2007 | Jabado et al. ............. 106/286.3 |
| 2008/0099538 A1 | 5/2008 | DeBiccari et al. |
| 2008/0166585 A1 | 7/2008 | Allen et al. |
| 2009/0056620 A1 | 3/2009 | Oda et al. |
| 2009/0256010 A1 | 10/2009 | Golna et al. |
| 2010/0327535 A1 | 12/2010 | Grace et al. |

OTHER PUBLICATIONS

Nancy Rashid, Ph.D, University of California, Davis; "Unique Nanocrystalline Coatings and Composites for Extreme Applications"; NANOWorld 2004, Patent Pending.

Leonardo Ajdelsztajn et al.; "Cold Spray Deposition of Nanocrystalline Aluminum Alloys"; Metallurgical and Materials Transactions, vol. 36A, Mar. 2005; pp. 657-666.

L. Ajdelsztajn et al.; "Synthesis and Mechanical Properties of Nanocrystalline Ni Coatings Produced by Cold Gas Dynamic Spraying"; Surface & Coatings Technology 201 (2006); pp. 1166-1172; www.sciencedirect.com.

Eklavya Calla; "Cold Gas Spraying of Copper and Tin onto Metallic and Non Metallic Substrates"; The University of Nottingham; Thesis, Nov. 2005, pp. 1-327.

* cited by examiner

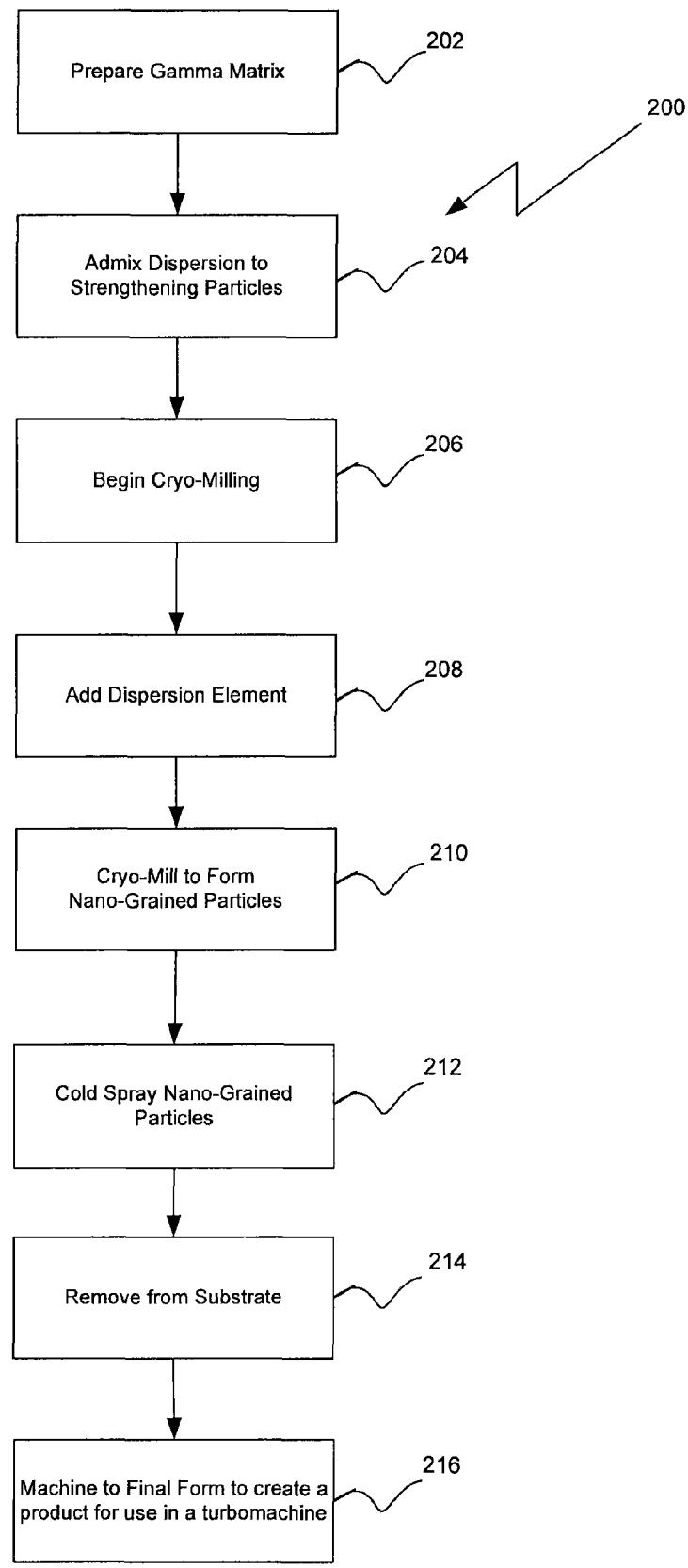

METHOD OF COATING WITH CRYO-MILLED NANO-GRAINED PARTICLES

BACKGROUND OF THE INVENTION

The present invention pertains to the art of cold spraying and, more particularly, to cold spraying cryo-milled, nano-grained particles.

Conventionally, cold spray techniques are employed to provide a surface treatment to a component. Cold spray techniques are employed when it is desired to apply a coating material without adding heat or the like to affect a bond between the component to be coated and the coating material. The lack of heat utilized in bonding the particles to a substrate ensures that nano-grained particle feedstock or powder will form a coating or deposit having a nano-grained structure. The nano-grained deposit can be used as a coating or removed from the substrate and employed as a free form material.

BRIEF DESCRIPTION OF THE INVENTION

In accordance with an exemplary embodiment of the invention, a method of coating a substrate with cryo-milled, nano-grained particles includes forming a face-centered-cubic gamma matrix comprising nickel, cobalt, chromium, tungsten and molybdenum, adding a dispersion strengthening material to the gamma matrix to form a first mixture, cryo-milling the first mixture to form a second mixture to form a nano-grained structure, and cold spraying the second mixture onto a substrate to form a coating having a nano-grained structure.

BRIEF DESCRIPTION OF THE DRAWINGS

FIG. 1 is a flow chart illustrating a method of cold spraying cryo-milled nano-grained materials in accordance with exemplary embodiments of the invention.

DETAILED DESCRIPTION OF THE INVENTION

Exemplary embodiments of the invention are directed to a method 200 of cold spraying cryo-milled nano-grained materials illustrated in FIG. 1. Cold spraying the cryo-milled nano-grained material feedstock onto a substrate to form a coating or a subsequent article is accomplished without the introduction of heat. Maintaining low temperatures ensures that structural properties of the feedstock remain substantially unchanged. More specifically, the low temperatures of the feedstock and high application velocities that result in lower in-flight time and no in-flight oxidation lead to coatings and/or articles that posses the nano-grained structure of the feedstock.

Initially, a gamma matrix is formed as indicated in block 202. The gamma or austenitic matrix includes a plurality of constituents that form a foundation for a feedstock that is cold sprayed to form a coating and/or a final article. In accordance with the exemplary embodiment, the gamma matrix includes, by percentage weight, about 30%-50% Nickel (Ni); about 10%-30% Cobalt (Co); about 10%-30% Chromium (Cr); about 4%-10% Molybdenum (Mo) and Tungsten (W); about 0%-6% Rhenium (Re); about 0%-5% Aluminum (Al); about 0%-5% Titanium (Ti); and about 0%-6% Niobium (Nb) and Tantalum (Ta).

The above listed constituents form a nickel based face-centered-cubic (fcc) matrix. The nickel based fcc structure provides inherent ductility. Moreover, a nickel-based structure provides a close packed crystal structure that possesses a lower diffusivity for high temperature applications. The inclusion of cobalt provides hot corrosion resistance, chromium provides oxidation resistance molybdenum, tungsten and rhenium provide solid solution strengthening and increased creep strength, and aluminum, titanium, niobium and tantalum provide a potential for forming coherent and ordered precipitate that act as strengtheners.

In addition to the strengtheners described above, dispersion-strengthening particles are added to the gamma matrix to form a first or base mixture as indicated in block 204. More specifically, the gamma matrix is strengthened by the addition of hard carbide or oxide phase materials such as tungsten carbide (WC), chromium carbide (CrC), alumina, yttria, and/or hafnia. The dispersion strengthening particles act as strong barriers to dislocations (carriers of plastic strain in materials) and lead to a significant increase in strength across a wide range of temperatures. In addition to, or as an alternative, the first mixture is formed by subjecting the gamma matrix to a heat-treatment process to form coherent and ordered gamma-prime ($\gamma'$) precipitate that provides an increase in strength across a wide range of temperatures. The increase in strength occurs from a hard carbide phase dispersoids or oxide phase dispersoids, precipitation of $\gamma'$ or combinations thereof In further accordance with an exemplary embodiment of the invention, the first mixture is cryo-milled to form nano-grained structure as indicated in block 206. Cryo-milling media chemistry includes includes, in accordance with one aspect of the exemplary embodiment, liquefied inert gas such as Argon (Ar), and/or Nitrogen (N), or gas mixtures such as Argon mixed with about 5% by weight Oxygen ($O_2$). During cryo-milling, a dispersant element such as, for example, Carbon (C) is added as indicated in block 208 Carbon in solid solution leads to precipitation of strengthening carbides, which may form either in bulk or in grain boundaries. More specifically, control of the cryo-milling media chemistry, and dispersion of Carbon while cryo-milling, produces intrinsically dispersed carbides, nitrides, carbo-nitrides, oxy-carbo-nitrides and the like. Oxides may form either by adding small amounts of Oxygen in the cryo-milling media chemistry or from Oxygen present in the first mixture constituents. In any event, cryo-milling continues until a nano-grained is achieves and a second or feedstock mixture formed as indicated in block 210.

In accordance with another aspect of the invention, the first mixture may be formed by $\gamma'$ precipitation in the gamma ($\gamma$) matrix, then cryo-milling to produce a second mixture or feedstock having a nano-grained structure. Additional strengthening is achieved by adding hard carbide or oxide phase dispersoids. The added dispersoids may be separately produced as nano-grained or micro-grained, or cryo-milled along with the first mixture.

Once formed, the feedstock is cold-sprayed onto a substrate to form a net shape as indicate in block 212. Cold spraying involves forcing the feedstock and a gas through a nozzle, which, depending upon a desired application, takes the form of a converging/diverging nozzle or a non-converging/diverging nozzle. The nozzle accelerates the gas and the feedstock to a very high speed for delivery onto the substrate. The gas forces the powder onto the substrate at speeds, typically in a range of between 800 m/s to 900 m/s. The high-speed delivery forces the powder or coating material to adhere to the substrate and form a coating. Of course it should be understood that delivery speeds could vary to levels below 800 m/s and above 900 m/s depending on desired adhesion characteristics.

Once formed, the coating is removed from the substrate as shown in block 214, and the net shape is machined to form a final article as indicated in block 216. Of course it should be understood that the nano-grained structure material may be employed as a coating or the coating/substrate could be employed as a freestanding material or free form for use as or to be fabricated for industrial components or parts. By employing a cold-spray process to direct the nano-grained structure feedstock onto the substrate, any resulting article will itself have a nano-grained structure with all material properties associated therewith. In accordance with one aspect of the invention, the above-described method is employed to produce products for use in connection with turbomachinery such as buckets, blades, casings and the like.

In general, this written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of exemplary embodiments of the present invention if they have structural elements that do not differ from the literal language of the claims, or if they include equivalent structural elements with insubstantial differences from the literal language of the claims.

The invention claimed is:

1. A product for use in a turbomachine produced by a process comprising the steps of:
   forming a face-centered-cubic gamma matrix comprising nickel, cobalt, chromium, tungsten and molybdenum;
   adding a dispersion strengthening material to the gamma matrix to form a first mixture;
   cryo-milling the first mixture to form a second mixture having intrinsically dispersed carbides, nitrides, carbo-nitrides, oxy-carbo-nitrides and oxides, the second mixture having a nano-grained structure; and
   cold spraying the second mixture onto a substrate to form a coating, the coating having a nano-grained structure.

2. The product formed by the process of claim 1, wherein forming the gamma matrix further comprises adding at least one of aluminum and titanium.

3. The product formed by the process of claim 1, wherein adding the dispersion strengthening material comprises adding at least one of alumina, yttria, zirconia, hafiiia, tungsten carbide, and chromium carbide to the gamma matrix.

4. The product formed by the process of claim 1, wherein adding the dispersion strengthening material comprises heat-treating the gamma matrix to form a gamma-prime precipitate to form the first mixture.

5. The product formed by the process of claim 1, wherein cryo-milling the first mixture comprises cryo-milling the first mixture in a cryo-milling media chemistry including a liquefied inert gas.

6. The product formed by the process of claim 1, wherein forming the gamma matrix includes admixing about 30-50% nickel, about 10-30% cobalt, about 4-10% molybdenum, about 4-10% tungsten, and about 10-30% chromium.

7. The product formed by the process of claim 1, wherein forming the gamma matrix further comprises at least one of about 0-6% rhenium, about 0-6% niobium, about 0-6% tantalum, about 0-5% aluminum, and about 0-5% titanium.

* * * * *